United States Patent [19]

Furuichi et al.

[11] 4,400,807

[45] Aug. 23, 1983

[54] STYLUS POSITION DETECTING APPARATUS

[75] Inventors: Tokinori Furuichi, Yokohama; Junichi Ikoma, Yokosuka; Masao Oguri, Yokohama; Yoshio Miura, Yokohama; Keizo Shimizu, Yokohama, all of Japan

[73] Assignee: Hitachi, Ltd., Tokyo, Japan

[21] Appl. No.: 321,761

[22] Filed: Nov. 13, 1981

[30] Foreign Application Priority Data

Nov. 14, 1980 [JP] Japan .................................. 55-159489

[51] Int. Cl.³ .......................... G11B 9/06; G11B 21/10
[52] U.S. Cl. ...................................... 369/220; 369/43; 369/126
[58] Field of Search .................... 369/55, 56, 57, 219, 369/220, 43, 126, 221

[56] References Cited

U.S. PATENT DOCUMENTS

| 4,280,023 | 7/1981 | Christopher | 369/126 |
| 4,313,189 | 1/1982 | McGuffin | 369/126 |
| 4,327,434 | 4/1982 | Christopher | 369/220 |

Primary Examiner—Steven L. Stephan
Attorney, Agent, or Firm—Antonelli, Terry & Wands

[57] ABSTRACT

A stylus position detecting apparatus in use for a video disc player using a disc of the groove type, detecting plates for detecting leakage components of a high frequency signal supplied from a high frequency signal source and flowing through a flylead, and for reading out a recorded signal in a disc are provided on both sides of the flylead. The leakage signal components detected by the detecting plates are detected to positive and negative directions with respect to a reference voltage. These voltages obtained by the detections are added by an adder, to find a stylus position.

3 Claims, 8 Drawing Figures

STYLUS POSITION DETECTING APPARATUS

The present invention relates to a stylus position detecting apparatus in use for driving an arm servo system in a video disc player.

In a video disc player, the information recorded in a disc is read out by means of a stylus in a pick-up mounted on an arm. The arm is so controlled as to be positioned at a given location on the disc by an arm feed mechanism. A system to effect such control is the arm servo system.

A block diagram of an typical arm servo system used in a conventional video disc player is shown in FIG. 1.

In FIG. 1, reference numeral 1 designates a first high frequency signal source. Reference numeral 2 designates a flylead for transmitting a high frequency signal (referred to as a carrier) generated from the first high frequency signal source 1. Reference numeral 4 designates a disc, 5 a second high frequency signal source (referred to as an oscillator). Reference numeral 6 represents an electrode provided on the pick-up, 7 a tuning detector, 8 a playback signal processing circuit, 9 an envelope detector, 10 a comparator, 11 a drive signal generating circuit, 12 an arm feed motor, 13 an arm feed mechanism. The apparatus thus constructed is disclosed in RCA Review, volume 39, No. 1, issued March, 1978, for example. The oscillator 5 generates a signal with a single frequency which in turn is converted into a capacitive carrier for detecting a capacitance change, by means of a variable capacitor or the like. The capacitive carrier is supplied to the electrode plate 6 fixed to the pick-up to detect a capacitance between the electrode plate and the flylead 2. Since the electrode plate 6 is fixed to the pick-up, the capacitance therebetween changes in accordance with a displacement of the stylus 3, or a displacement of the flylead 2. The change of the capacitance is used as a stylus position detecting signal. A record signal recorded on the disc is read out from the flylead 2 through the stylus 3 and the disc 4, by applying the carrier into the flylead 2. The signal read out through the flylead 2 is detected by the tuning detector 7 and then is processed by the playback signal processing circuit 8. The capacitance between the electrode plate 6 and the flylead 2 is controlled in such a manner that the signal obtained as an amplitude change of the output signal of the oscillator 5 simultaneously with the playback signal is detected by the envelope detector 9 and the output of the detector 9 is compared with a given reference voltage by means of the comparator 10 to thereby control the capacitance in accordance with the result of the comparison. By the product of the output signal from the comparator 10 and the pulse signal from the drive signal generator 11, the arm feed motor 12 is pulse-driven and the data representing the product drives the arm feed mechanism 13 to control the pick-up arm. The pulse signal is obtained by separating the vertical synchronizing signal from the playback video signal, for example, and frequency dividing the separated one. The arm feed motor 12 is made up of a DC motor or the like, and the arm feed mechanism 13 is provided with a reduction mechanism and a feed mechanism. In this arrangement, the motor speed is reduced by a gear system and the reduced speed is transferred to the arm through the screw feed.

This conventional stylus position detecting apparatus as mentioned above requires the oscillator 5 for forming a second carrier used for obtaining a stylus position detecting signal, in addition to the carrier for obtaining the playback signal. Further, the conventional apparatus requires the adjustment of the reference voltage for the comparison with the stylus position detecting signal. Since the stylus position detecting signal is taken out through the same path as that of the playback signal, when the output signal of the oscillator 5 is large, it adversely influences the playback signal. On the other hand, when the output signal from the oscillator 5 is small, the stylus position can not accurately be found.

Accordingly, an object of the present invention is to provide a stylus position detecting apparatus with a simple construction and no adverse influence on a playback signal, while eliminating the above-mentioned defects.

In the present invention, a high frequency voltage which has different values in accordance with a stylus position is detected by detecting means disposed on both sides of the stylus or the flylead. The signals are demodulated to positive and negative directions with respect to a reference voltage. The sum of these demodulated signals is used as a stylus position detecting signal to find a stylus position, and is used to control the feed of the arm.

The present invention will be apparent from the following detailed description taken in conjunction with the accompanying drawings, in which.

Figure 2:
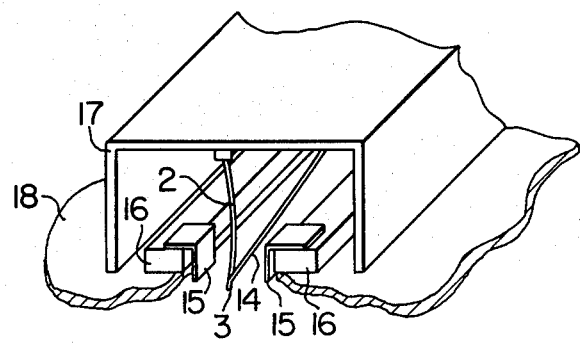
FIGS. 2, 3 and 5 illustrate structures showing an embodiment of a stylus position detecting apparatus according to the present invention.
Figure 3:
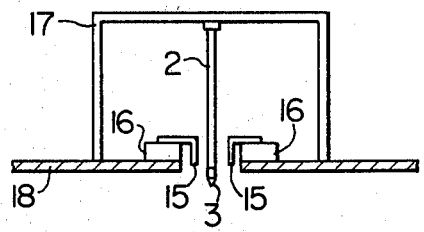

Preferred embodiments of a stylus position detecting apparatus according to the present invention will be described referring to the accompanying drawings. FIGS. 2 and 3 illustrate a first embodiment of the present invention in which an electrode plate is used as a detecting means. FIG. 2 shows a perspective view illustrating a structure in the vicinity of an electrode plate and a cantilever. FIG. 3 shows a front view of the structure shown in FIG. 2. A stylus 3 is mechanically supported on a stylus cartridge 17 by means of a cantilever 14 and a flylead 2, and is contained with such an arrangement. The stylus 3 has an electrical connection through the flylead 2. An electrode plate 15 is fixed to an arm 18 by means of an electrode support table 16 and is not directly connected to the stylus cartridge 17, allowing a free removal of the cartridge 17.

Figure 1:
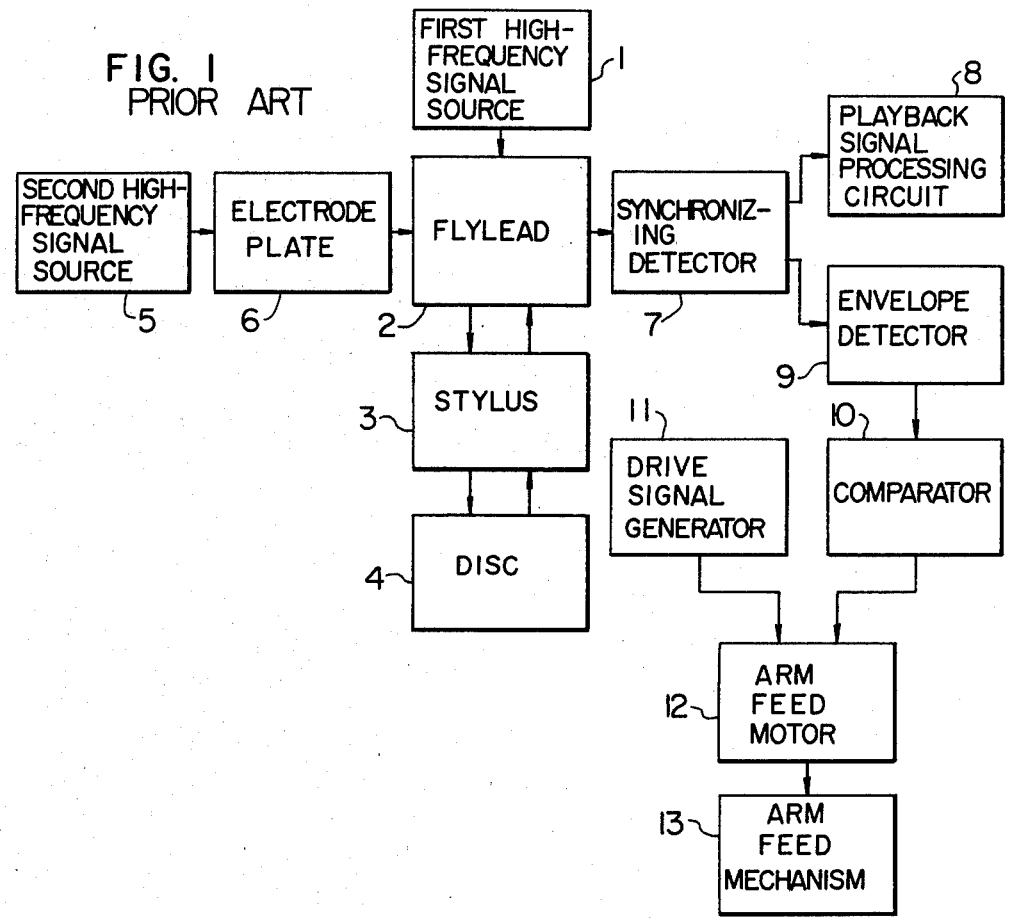
FIG. 1 shows a block diagram illustrating an arrangement of the arm servo system in a prior video disc player.
Figure 4:
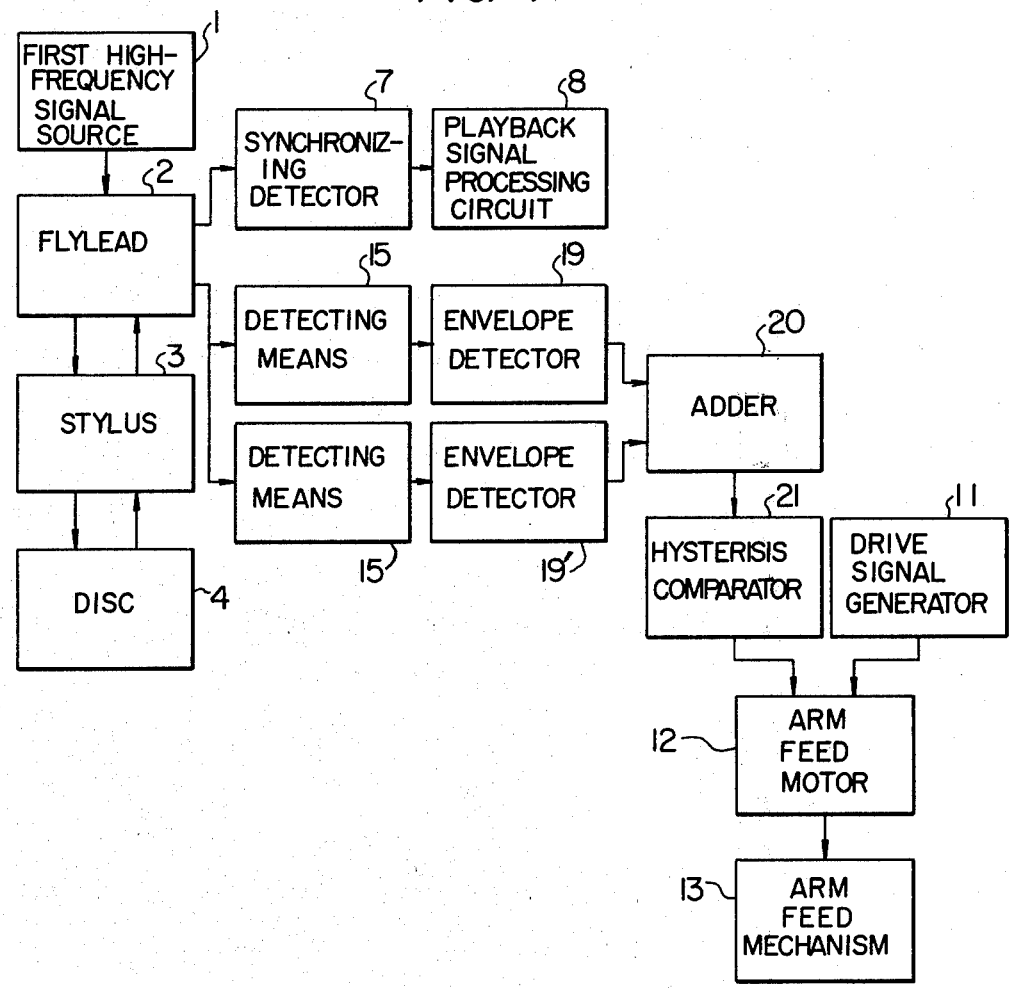
FIG. 4 is a block diagram illustrating a circuit arrangement of a stylus position detecting apparatus according to the present invention.

Turning now to FIG. 4, there is shown a block diagram of an embodiment of an overall arm servo system implementing the present invention. In the figure, like reference numerals designate like components in FIG. 1. A record signal is transmitted by a carrier derived from a high frequency signal source 1 to a tuning detector 7, through the flylead 2, the stylus 3 and a disc 4. The recording signal thus transmitted is detected by the turning detector 7 and is processed by a playback signal processing circuit 8. The signal process up to this point is the same as that of the prior art.

With the arrangement that the electrode plates 15 are placed on both sides of the stylus 3 or the flylead 2, as shown in FIGS. 2 and 3, an AC voltage induced on the flylead by the carrier are electrostatically voltage-divided by a capacitance between the flylead 2 and the electrode plate 15 and a capacitance between the electrode plate 15 and the arm 18 which is earthed. The AC voltages, which are voltage-divided in accordance with a ratio between these two capacitances, are induced in both the electrodes 15, and are envelope-detected respectively by envelope detectors 19 and 19' to positive and negative directions with respect to a reference voltage Vo. The detections may readily be realized by using combinations of diodes and capacitors.

The output signals from the detectors 19 and 19' are added by an adder 20 to produce a DC voltage depending on a distance between the flylead 2 and one of the electrode plates 15. Since the electrode plates 15 are positioned in opposition to the flylead 2 near the stylus 3, the DC voltage is used as a stylus position detecting signal. The adder 20 may be constituted by arranging resistors.

The stylus position detecting signal goes to negative or positive sides with respect to the reference voltage Vo in accordance with the position of the stylus 3. Accordingly, it is preferable that both the electrodes 15 are disposed so that the stylus position detecting signal is equal to the reference voltage when the stylus 3 is in a normal position with respect to the arm 18. Specifically, when it is desired to control the stylus 3 at the center position of the arm 18, for example, if the electrodes 15 and 15' are so disposed that the center between the electrode plates is coincident with the center of the arm with respect to earth position, the stylus position detecting signal equals the reference voltage when the stylus 3 reaches the center position of the arm 18. In case of amplifying the stylus position detecting signal by an amplifier of single-poler type, it is possible to set the reference voltage to a particular value instead of the earth voltage. The output signal from a hysteresis comparator 21 for comparing the stylus position detecting signal with the reference voltage and a pulse signal from a drive signal generator 11 are used to drive an arm feed motor 12 to thereby control the arm through an arm feed mechanism 13. The hysteresis comparator 21, formed by the IC commercially available, produces an output signal with a hysteresis characteristic, that is, two levels which are high and low.

When a particular bias voltage is used as the reference voltage at the envelope detection stage, this bias voltage should also be used as the reference voltage of the hysteresis comparator 21.

Figure 5:
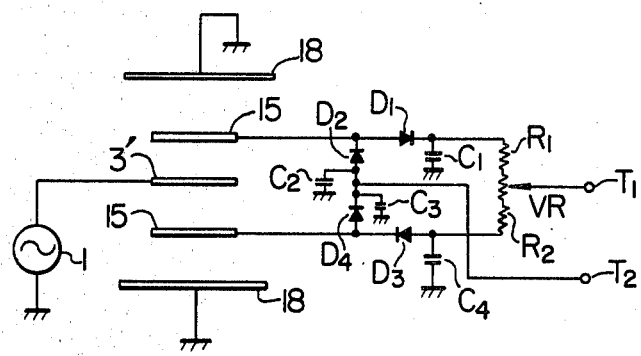

FIG. 5 shows a practical arrangement of the substantial portion of the embodiment shown in FIGS. 2 to 4. In FIG. 5, reference numeral 1 designates a high frequency signal source, and 3' symbolically represents the flylead 2 or the stylus 3. Reference numeral 15 stands for electrode plates used as detecting means and numeral 18 is representative of the arm with the pick-up. D1 to D4 are diodes, C1 to C4 capacitors, R1 and R2 fixed resistors, VR a variable resistor for correcting the detected position of the stylus. Nominal values for the components in the circuit in the embodiment are: C1 to C4, 150 pF; R1 and R2, 12 K$\Omega$; VR, 20 K$\Omega$B; D1 to D4, 1SS86. The diodes D2 and D4 may be replaced by resistors. T1 designates a terminal for leading the added signal. T2 is a terminal to which the reference potential is supplied. The reference potential is formed by voltage-dividing the power voltage by the resistor, for example. Ground potential may also be used for the reference potential.

Figure 6:
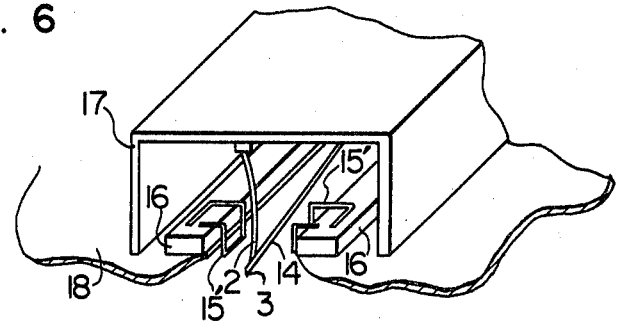
FIGS. 6 to 8 illustrate structures showing another embodiment of the present invention.
Figure 7:
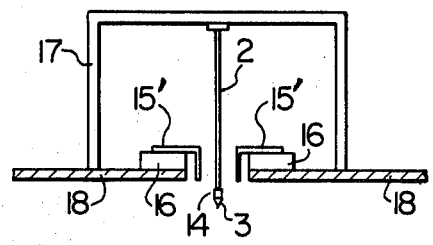

FIGS. 6 and 7 illustrate another embodiment of the present invention in which coils are used for the detecting means instead of the electrode plates. FIG. 6 is a perspective view illustrating a structure near the coils and the cantilever. FIG. 7 is a front view of the structure shown in FIG. 6. The stylus 3 is supported on the stylus cartridge 17 by means of the cantilever 14 and the flylead 2, and contained in the arm 18 with its assemblage. Each of coils 15' is supported by the electrode plate (coil support table) 16 which is supported by the arm 18, and the coil 15' is mechanically free from the stylus cartridge 17.

Figure 8:
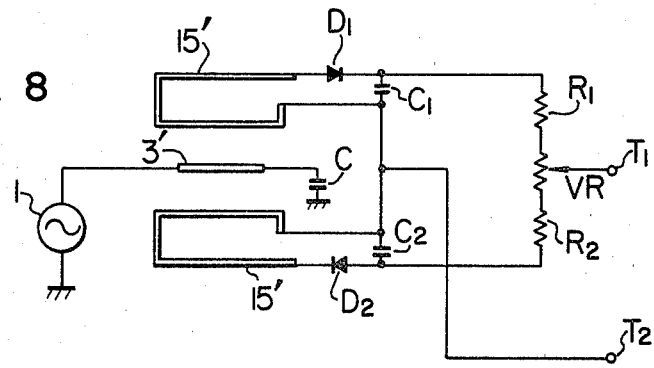

FIG. 8 is a practical circuit arrangement of the embodiment shown in FIGS. 6 and 7. In FIG. 8, reference numeral 1 designates a high frequency signal source, 3' schematically illustrates the flylead 2 or the stylus 3. 15' stands for the coil as the detecting means. C is the information recorded in the form of the electrostatic capacitance. C1 and C2 designate capacitors, D1 and D2 diodes. The lead wire of each of the diodes may also be used for the coil as the detecting means. R1 and R2 designate fixed resistors, Vr a variable resistor for correcting the detected position of the stylus. T1 designates a terminal through which the added signal is led, T2 a terminal supplied with the reference potential. Nominal values of the components are: 150 pF for C1 and C2, 12 K$\Omega$ for R1 and R2, 20 K$\Omega$B for VR, 1SS86 for D1 and D2.

The recording signal is taken out by the output signal from the high frequency signal source through the flylead 2, the stylus 3 and the disc 4, and is detected by the tuning detector 7 and finally is signal-processed by the reproduction signal processing circuit 8. A resonance current resonating with the electrostatic capacitor of the disc 4 flows through the flylead 2. Accordingly, magnetic fluxes are developed around the flylead 2. As shown in FIGS. 5 and 6, because of the provision of the coils 15' on both sides of the stylus 3, an AC magnetic field around the flylead 2 provides AC voltages induced in the coils 15'. The number of magnetic induction lines interlinking with the coils 15' changes depending on distances from the coils 15' to the flylead. Accordingly, the AC voltages depend on the distances. One of the AC voltages induced in the coils 15' is envelope-detected to a positive direction with respect to the reference voltage Vo, while the other AC voltage is envelope-detected to a negative direction. The detection may readily be realized by using the combination of diodes and resistors. The addition of the two detected voltages by the adder 20 provides a signal dependent on the distance from the flylead 2 to one of the coils. Since the coil 15' interlinks near the stylus 3 with the fluxes existing around the flylead 2, that signal is used as the stylus position detecting signal. The adder may be constituted by arranging the resistors R1, R2 and VR, for example.

The stylus position detecting signal goes positive or negative with respect to the reference voltage Vo in accordance with the position of the stylus 3. Therefore, it is preferable that both the coils are disposed so that the stylus position detecting signal is equal to the reference voltage when the stylus 3 is positioned at a normal position with relation to the arm 18. To this end, for controlling the stylus 3 at the center of the arm 18, for example, when the center between both the coils is set at the center of the arm 18, the stylus position detecting signal is equal to the reference voltage when the stylus 3 is at the center position of the arm 18. The stylus position detecting signal led to the terminal T1 may be used as in the embodiment shown in FIG. 4. Accordingly, the explanation thereof will be omitted.

The stylus position detecting apparatus according to the present invention requires no oscillator for forming the carrier to detect the stylus position and no adjustment for setting the reference voltage.

Further, the stylus position detecting signal is processed through a signal path quite different from that of the playback signal. This feature can control the arm without any adverse influence on the playback signal.

What is claimed is:

1. A stylus position detecting apparatus for controlling an arm servo system of a disc player in which a high frequency signal is led from a high frequency signal source to a stylus electrode and a change of capacitance between said stylus electrode and a disc is taken out in the form of an information signal, said stylus position detecting apparatus comprising:
   detecting means positioned at the both sides of a conductor connecting the output of said high frequency signal source to said stylus electrode for detecting leakage components of the high frequency signal flowing through said conductor;
   means for supplying a reference potential;
   a detector circuit which detects a signal detected by said detecting means to positive and negative directions with respect to said reference potential; and
   adding means for adding two voltages obtained by the detections to said positive and negative directions to produce a stylus position detecting signal.

2. A stylus position detecting apparatus according to claim 1, wherein said detecting means is electrode plates.

3. A stylus position detecting apparatus according to claim 1, wherein said detecting means is pick-up coils.

* * * * *